(12) United States Patent
Shin et al.

(10) Patent No.: US 8,621,225 B2
(45) Date of Patent: *Dec. 31, 2013

(54) METHOD AND APPARATUS FOR ENHANCING SECURITY OF WIRELESS COMMUNICATIONS

(75) Inventors: Sung-Hyuk Shin, Northvale, NJ (US); Alexander Reznik, Titusville, NJ (US); Guodong Zhang, Syosset, NY (US); Prabhakar R Chitrapu, Blue Bell, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 121 days.

This patent is subject to a terminal disclaimer.

(21) Appl. No.: 13/043,095

(22) Filed: Mar. 8, 2011

(65) Prior Publication Data
US 2011/0161673 A1 Jun. 30, 2011

Related U.S. Application Data

(63) Continuation of application No. 11/192,918, filed on Jul. 29, 2005, now Pat. No. 7,904,723.

(60) Provisional application No. 60/643,221, filed on Jan. 12, 2005.

(51) Int. Cl.
*G06F 21/00* (2013.01)

(52) U.S. Cl.
USPC ............. 713/176; 455/70; 455/307; 370/335; 370/479; 380/44; 380/201

(58) Field of Classification Search
USPC ........................................................ 713/176
See application file for complete search history.

(56) References Cited

U.S. PATENT DOCUMENTS

| | | |
|---|---|---|
| 5,748,783 A | 5/1998 | Rhoads |
| 5,778,304 A | 7/1998 | Grube et al. |
| 5,960,081 A | 9/1999 | Vynne et al. |

(Continued)

FOREIGN PATENT DOCUMENTS

| | | |
|---|---|---|
| EP | 0 505 266 | 3/1992 |
| EP | 0 830 046 | 3/1998 |

(Continued)

OTHER PUBLICATIONS

Radio frequency watermarking for OFDM wireless networks | http://ieeexplore.ieee.org/stamp/stamp.jsp?tp=&arnumber=1327131 | Kleider et al.| 2004.*

(Continued)

*Primary Examiner* — Mahfuzur Rahman
(74) *Attorney, Agent, or Firm* — Volpe and Koenig, P.C.

(57) ABSTRACT

The present invention is related to a method and apparatus for enhancing security of communications. The apparatus comprises a security processing unit, a data processing unit, a cross-layer watermarking unit, and optionally a smart antenna processor. The security processing unit generates a token/key to be used in watermarking and sends a node security policy to other components. The data processing unit generates user data. The cross-layer watermarking unit includes at least one of Layer-2/3, Layer-1 and Layer-0. Each layer performs a different scheme or degree of watermarking. The cross-layer watermarking unit embeds the token/key into the user data transmission on at least one of the layers selectively in accordance with a security policy.

5 Claims, 4 Drawing Sheets

(56) References Cited

U.S. PATENT DOCUMENTS

| | | | |
|---|---|---|---|
| 6,018,374 A | 1/2000 | Wrobleski | |
| 6,266,541 B1 | 7/2001 | Noda | |
| 6,343,213 B1 | 1/2002 | Steer et al. | |
| 6,353,778 B1 | 3/2002 | Brown | |
| 6,393,254 B1 | 5/2002 | Pousada Carballo et al. | |
| 6,529,600 B1 | 3/2003 | Epstein et al. | |
| 6,553,070 B2 | 4/2003 | Hashimoto | |
| 6,559,883 B1 | 5/2003 | Fancher et al. | |
| 6,591,096 B2 | 7/2003 | Ezuriko | |
| 6,625,455 B1 | 9/2003 | Ariga | |
| 6,662,023 B1 | 12/2003 | Helle | |
| 6,687,497 B1 | 2/2004 | Parvulescu et al. | |
| 6,738,572 B2 | 5/2004 | Hunter | |
| 6,771,946 B1 | 8/2004 | Oyaski | |
| 6,856,693 B2 | 2/2005 | Miller | |
| 6,868,229 B2 | 3/2005 | Balogh | |
| 6,983,057 B1 | 1/2006 | Ho et al. | |
| 7,418,735 B2 | 8/2008 | Kori et al. | |
| 7,623,673 B2 * | 11/2009 | Mercier | 382/100 |
| 2001/0031631 A1 | 10/2001 | Pitts | |
| 2001/0034835 A1 | 10/2001 | Smith | |
| 2002/0039896 A1 | 4/2002 | Brown | |
| 2002/0055361 A1 | 5/2002 | McDonnell et al. | |
| 2002/0058497 A1 | 5/2002 | Jeong | |
| 2002/0076054 A1 | 6/2002 | Fukutomi et al. | |
| 2002/0076084 A1 | 6/2002 | Tian et al. | |
| 2002/0107032 A1 | 8/2002 | Agness et al. | |
| 2002/0168082 A1 | 11/2002 | Razdan | |
| 2002/0186845 A1 | 12/2002 | Dutta et al. | |
| 2002/0194492 A1 | 12/2002 | Choi et al. | |
| 2003/0078076 A1 | 4/2003 | Kuwajima et al. | |
| 2003/0104808 A1 | 6/2003 | Foschini et al. | |
| 2003/0122671 A1 | 7/2003 | Jespersen | |
| 2003/0123659 A1 | 7/2003 | Forstrom et al. | |
| 2003/0133573 A1 | 7/2003 | Himmel et al. | |
| 2003/0169342 A1 | 9/2003 | Steinberg et al. | |
| 2003/0185417 A1 | 10/2003 | Alattar et al. | |
| 2003/0219231 A1 | 11/2003 | Vernon | |
| 2004/0005055 A1 | 1/2004 | Master et al. | |
| 2004/0028255 A1 | 2/2004 | Miller | |
| 2004/0029560 A1 | 2/2004 | Ariga | |
| 2004/0073916 A1 | 4/2004 | Petrovic et al. | |
| 2004/0081131 A1 | 4/2004 | Walton et al. | |
| 2004/0110515 A1 | 6/2004 | Blumberg et al. | |
| 2004/0155969 A1 | 8/2004 | Hayashi | |
| 2004/0198306 A1 | 10/2004 | Singh et al. | |
| 2004/0204021 A1 | 10/2004 | Cocita | |
| 2004/0204943 A1 | 10/2004 | Kirovski et al. | |
| 2005/0007456 A1 | 1/2005 | Lee et al. | |
| 2005/0008324 A1 | 1/2005 | Balogh | |
| 2005/0039020 A1 | 2/2005 | Levy | |
| 2005/0042999 A1 | 2/2005 | Rappaport | |
| 2005/0043548 A1 | 2/2005 | Cates | |
| 2005/0063027 A1 | 3/2005 | Durst et al. | |
| 2005/0108542 A1 | 5/2005 | Kirovski et al. | |
| 2005/0141704 A1 | 6/2005 | Van Der Veen | |
| 2007/0275669 A1 * | 11/2007 | Rietman et al. | 455/70 |
| 2010/0322470 A1 * | 12/2010 | Rodriguez | 382/100 |

FOREIGN PATENT DOCUMENTS

| | | |
|---|---|---|
| EP | 1 130 500 | 9/2001 |
| EP | 1 139 684 | 10/2001 |
| EP | 1 172 270 | 1/2002 |
| EP | 1 182 901 | 2/2002 |
| EP | 1 379 098 | 1/2004 |
| EP | 1 381 234 | 1/2004 |
| EP | 1 185 923 | 3/2004 |
| EP | 1 445 923 | 8/2004 |
| EP | 1 499 148 | 1/2005 |
| GB | 211612 | 2/1927 |
| GB | 2 329 794 | 3/1999 |
| GB | 2 343 339 | 5/2000 |
| GB | 2 348 573 | 10/2000 |
| GB | 2 367 720 | 4/2002 |
| GB | 2 374 986 | 10/2002 |
| GB | 2 393 075 | 3/2004 |
| JP | 2000013497 | 1/2000 |
| JP | 2000032557 | 1/2000 |
| JP | 2000152217 | 5/2000 |
| JP | 2000165952 | 6/2000 |
| JP | 2000332890 | 11/2000 |
| JP | 2001313006 | 11/2001 |
| JP | 2002044736 | 2/2002 |
| JP | 2002125267 | 4/2002 |
| JP | 2002159059 | 5/2002 |
| JP | 2003070058 | 3/2003 |
| JP | 2003143649 | 5/2003 |
| JP | 2003219466 | 7/2003 |
| JP | 2004056769 | 2/2004 |
| JP | 2004088273 | 3/2004 |
| JP | 2004153324 | 5/2004 |
| JP | 2004242096 | 8/2004 |
| JP | 2004260631 | 9/2004 |
| JP | 2004260796 | 9/2004 |
| JP | 2005033799 | 2/2005 |
| TW | 474104 | 1/2002 |
| WO | 98/34412 | 8/1998 |
| WO | 00/60556 | 10/2000 |
| WO | 02/09017 | 1/2002 |
| WO | 02/103968 | 12/2002 |
| WO | 03/028342 | 4/2003 |
| WO | 03/040898 | 5/2003 |
| WO | 03/047207 | 6/2003 |
| WO | 2004/077699 | 9/2004 |
| WO | 2004/089021 | 10/2004 |
| WO | 2004/102313 | 11/2004 |
| WO | 2005/069807 | 8/2005 |

OTHER PUBLICATIONS

Fingerprints in the Ether: Using the Physical Layer for Wireless Authentication| http://arxiv.org/pdf/0907.4877.pdf|Xiao et al.|2009|pp. 1-6.*

Arslanagic, "Personal Firewall in Mobile Phone", Masters Thesis in Information and Communication Technology, Agder University College Faculty of Engineering and Science, Grimstad, Norway, May 2004.

Caire et al., "On Achievable Rates in a Multi-Antenna Broadcast Downlink," In Processing of 38th Annual Allerton Conference on Communication, Control and Computing, (Monticello, IL, Oct. 4-6, 2000).

Caire et al., "On Achievable Rates in a Multi-Antenna Gaussian Broadcast Channel," IEEE International Symposium on Information Theory 2001, (Washington DC, Jun. 24-29, 2001).

Caire et al., "On the Achievable Throughput of the Multiantenna Gaussian Broadcast Channel," IEEE Transactions on Information Theory, vol. IT-49, No. 7, pp. 1691-1706, (Jul. 2003).

Caire et al., "On the Multiple-Antenna Broadcast Channel," Signals, Systems and Computers, 2001., Conference Record of the Thirty-Fifth Asilomar Conference, vol. 2, pp. 1188-1193, (2001).

Costa, "Writing on Dirty Paper," IEEE Transactions on Information Theory, vol. IT-29, No. 3, pp. 439-441, (May 1983).

Cox et al., "Watermarking As Communications With Side Information," Proceedings of the IEEE, vol. 87, No. 7, (Jul. 1999).

Davey et al., "Reliable Communication Over Channels with Insertions, Deletions, and Substitutions," IEEE Transactions on Information Theory, vol. 47, No. 2, pp. 687-698 (Feb. 2001).

Gamal et al., "A Proof of Marton's Coding Theorem for the Discrete Memoryless Broadcast Channel," IEEE Transactions on Information Theory, vol. IT-27, No. 1, pp. 120-122, (Jan. 1981).

Jiang et al., "'Watermarking' for Convolutionally/Turbo Coded Systems and Its Applications," IEEE Global Telecommunications Conference3, pp. 1421-1425, vol. 2 (2001).

Marton, "A Coding Theorem for the Discrete Memoryless Broadcast Channel," IEEE Transactions on Information Theory, vol. IT-25, No. 3, pp. 306-311, (May 1979).

(56) References Cited

OTHER PUBLICATIONS

Mobasseri, "Exploring CDMA for Watermarking of Digital Video", Security and Watermarking of Multimedia Contents, Electronic Imaging'99, San Jose, Jan. 23-29, 1999.

Sanzgiri et al., "A Secure Routing Protocol for Ad Hoc Networks", Proceedings of the 10th IEEE International Conference on Network Protocols (ICNP '02), IEEE, 2002, pp. 1-10.

Song et al., "Meta-fragile Watermarking for Wireless Networks," IEEE International Conference on Communications, Circuits and Systems and West Sino Expositions, vol. 1, pp. 488-491 (Jun. 29, 2002).

Weingarten et al., "The Capacity Region of the Gaussian MIMO Broadcast Channel," IEEE International Symposium on Information Theory 2004, pp. 174, (Chicago, IL, Jun. 27-Jul. 2, 2004).

Yu et al., "Iterative Water-Filling for Gaussian Vector Multiple Access Channel", Submitted to IEEE Transactions on Information Theory, (2002).

Yu et al., "Trellis Precoding for the Broadcast Channel", IEEE Globecom, (Nov. 2001).

Yu, "Competition and Cooperation in Multiuser Communication Environments", Ph.D. Thesis, Stanford University, (Stanford, CA, Jun. 2002).

* cited by examiner

METHOD AND APPARATUS FOR ENHANCING SECURITY OF WIRELESS COMMUNICATIONS

CROSS REFERENCE TO RELATED APPLICATION

This application is a continuation of U.S. patent application Ser. No. 11/192,918 filed on Jul. 29, 2005, which claims the benefit of U.S. Provisional Application No. 60/643,221 filed on Jan. 12, 2005, which is incorporated by reference as if fully set forth.

FIELD OF INVENTION

Wireless communication systems, by their very nature, are susceptible to many security and privacy related attacks. The continuing growth in prevalence of these wireless systems has further increased these vulnerabilities. Even ad-hoc-type networks, for instance, in which individual users communicate with each other directly without using intermediary network nodes, are susceptible to security, privacy, identity, etc. attacks.

To reduce the inherent vulnerability of wireless networks, techniques including Wired Equivalent Privacy (WEP), Wi-Fi Protected Access (WPA), Extensible Authentication Protocol (EAP), IEEE 802.11i, and Global System for Mobile Communication (GSM)-based encryption have been implemented in wireless communication systems. Although these techniques provide some protection, wireless communication systems remain susceptible to attacks. To illustrate, suppose a wireless user implements WEP security as a means of securing his wireless communications. Further suppose that the user receives a communication from an unknown network node possessing the correct WEP security keys. Inclusion of correct WEP keys in the communication should alert the user that the communication is from a trusted source. However, since the user is not familiar with the sending node and since WEP keys are just as likely to be hacked and copied as other wireless communications, the user may be reluctant to "trust" the communication. Further, even if a rogue user or hacker did not possess correct WEP security keys, since authentication of these keys typically occurs at higher layers of communication stacks, the hacker could access the communication stack and, for example, implement a denial-of-service attack prior to the authentication.

A current technique for verifying and securing media content is known as watermarking. Watermarking, also known as "content watermarking", is a technique for adding hidden verification and/or security data to various types of media content. Digital watermarking extends this concept to digital media. Content watermarking techniques, however, are designed to protect relatively static or unchanging types of content. Thus, for securing dynamic content, such as wireless communications transmitted in dynamic wireless environments, conventional content watermarking may not be a suitable means of protection.

Accordingly, it is desirable to have a method and apparatus for providing an enhanced watermarking scheme suitable for securing wireless communications in dynamic wireless environments.

SUMMARY

The present invention is related to a method and apparatus for enhancing security of wireless communications. The apparatus comprises a security processing unit, a data processing unit, a cross-layer watermarking unit, and optionally a smart antenna processor. The security processing unit generates a token/key to be used in watermarking and sends a node security policy to other components. The data processing unit generates user data. The cross-layer watermarking unit preferably includes at least one of a Layer-2/3 (i.e. a higher layer watermarking layer), Layer-1 (i.e. a physical (PHY) watermarking layer, and Layer-0 (i.e. a radio-frequency (RF) layer). Each layer performs a different scheme or degree of watermarking. The cross-layer watermarking unit selectively embeds the token/key into the user data transmission at least one of the layers selectively in accordance with a security policy.

BRIEF DESCRIPTION OF THE DRAWINGS

A more detailed understanding of the invention may be had from the following description of a preferred embodiment, given by way of example and to be understood in conjunction with the accompanying drawing wherein.

DETAILED DESCRIPTION OF THE PREFERRED EMBODIMENTS

The present invention is related to providing a watermarking scheme that can communicate tokens/keys, (i.e., watermarks), in a secure and robust way by embedding the watermarks into content, (e.g. user data), transmission, and/or a communicating device. A technique known as Dirty Paper Coding (DPC) is also provided to achieve the theoretical capacity of the watermarking scheme.

The communicating device includes, but is not limited to, a wireless transmit/receive unit (WTRU), a base station, or a wired communicating device. The terminology "WTRU" includes but is not limited to a user equipment (UE), a mobile station, a fixed or mobile subscriber unit, a pager, or any other type of device capable of operating in a wireless environment. The terminology "base station" includes but is not limited to a Node-B, a site controller, an access point, or any other type of interfacing device in a wireless environment.

The features of the present invention may be incorporated into an integrated circuit (IC) or be configured in a circuit comprising a multitude of interconnecting components.

DPC is the best-performing technique known for a wireless multiple input multiple output (MIMO) broadcast channel. In addition to its superior performance, DPC provides the added benefit of being a transmit-side technique, which means that much of the complexity in implementing this technique is shifted to the transmitter, rather than to receivers. As a result, an individual receiver is only required to be cognizant of details of communications intended for it, which further mitigates system information distribution issues. Furthermore, because each receiver can operate optimally without regard to details of transmissions intended to others, a DPC-type system provides a means for hiding transmissions from unintended receivers, thus making it suitable to support data hiding and watermarking as well as other security applications.

While recent analysis of DPC has yielded significant progress in the theoretical understanding of this technique, little is understood about how to build practical communication systems with DPC. As further discussed below, the present invention describes a method and apparatus for configuring communication system architectures to implement DPC.

In the present invention, watermarking is used to protect and enhance wireless communications. The terminology "transport watermarking" is used where watermarking is considered at transport processing and will be used interchangeably with the terms "security enhanced watermarking" and "cross-layer watermarking."

Figure 1:
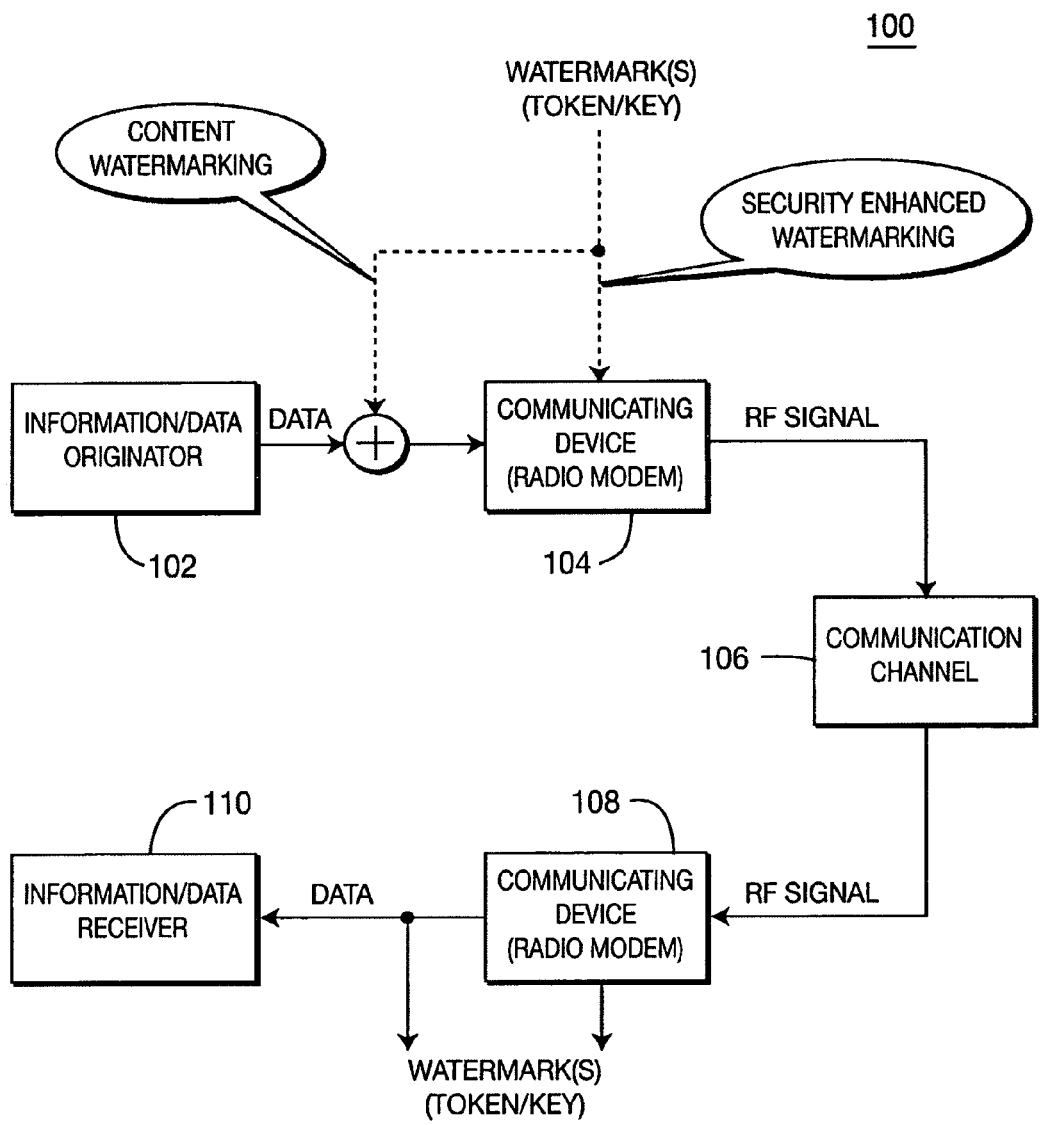
FIG. 1 is a block diagram of a communication system where a communication is secured with watermarking in accordance with the present invention.

FIG. 1 is a block diagram of a communication system 100 where a communication is secured with watermarking in accordance with an embodiment of the present invention. Data or information is generated by an information/data originator 102 and is first secured by "content watermarking." The content watermarked data/information can be further secured by "security enhanced watermarking" in the communicating device 104. In order to enhance the security/robustness level of watermarking, "security enhanced watermarking" is performed at various protocol layers in the communicating device. The watermark embedded user data is transmitted via communication channel 106. The watermarks are recovered by the communicating device 108 and original information/data is recovered by the receiver 110.

Content watermarking is an information embedding or hiding technique, which is used mostly for protecting and/or controlling multimedia content itself (including images, graphic, audio, video, and text) through the embedded information (i.e., watermark message). As seen in FIG. 1, a watermark message (or token/key) is embedded directly within the content, (e.g., multimedia content), to be protected, so that the watermark message remains in the content in its original form. Its applications include copyright protection, copy control, tamper detection, and data authentication such that content watermarking can be used for data integrity/authentication to determine whether the data has been modified, and determine who created the document and when, etc. It should be noted that content watermarking is generally implemented at the application level.

On the other hand, security enhanced watermarking is an alternate approach to protect and enhance communications, (especially wireless communications), where watermarking is considered at the transport level. In this case, the watermark message (or token/key) is embedded into the user data and/or a wireless air interface (like a communication device or a radio modem). Depending on where the watermark is embedded, various techniques are available for embedding it. The techniques may be classified into Layer-2/3 (i.e. a higher layer watermarking layer), Layer-1 (i.e. a physical (PHY) watermarking layer), and Layer-0 (i.e. a radio-frequency (RF) layer).

Prior art watermarking is related to applications and content (i.e., application level) watermarking. The present invention takes concepts of content watermarking and extends them into the transport levels to solve the problems unaddressed by content watermarking, (e.g., link authentication). Content watermarking and transport watermarking are performed in separate steps: content watermarking at the application layer and transport watermarking at the transport level (including Layer 2/3, PHY Layer, and RF Layer).

In transport watermarking, the watermark itself can be, for example, a signature unique to the originator (such as a biometric signature) and/or a signature unique to the radio modem (such as the cell phone's ESN and hardware nonlinearity). Such signatures can be used for authenticating the user data and/or the device. In addition, the watermark can also be any other low data rate stream, meant as side information.

Figure 2:
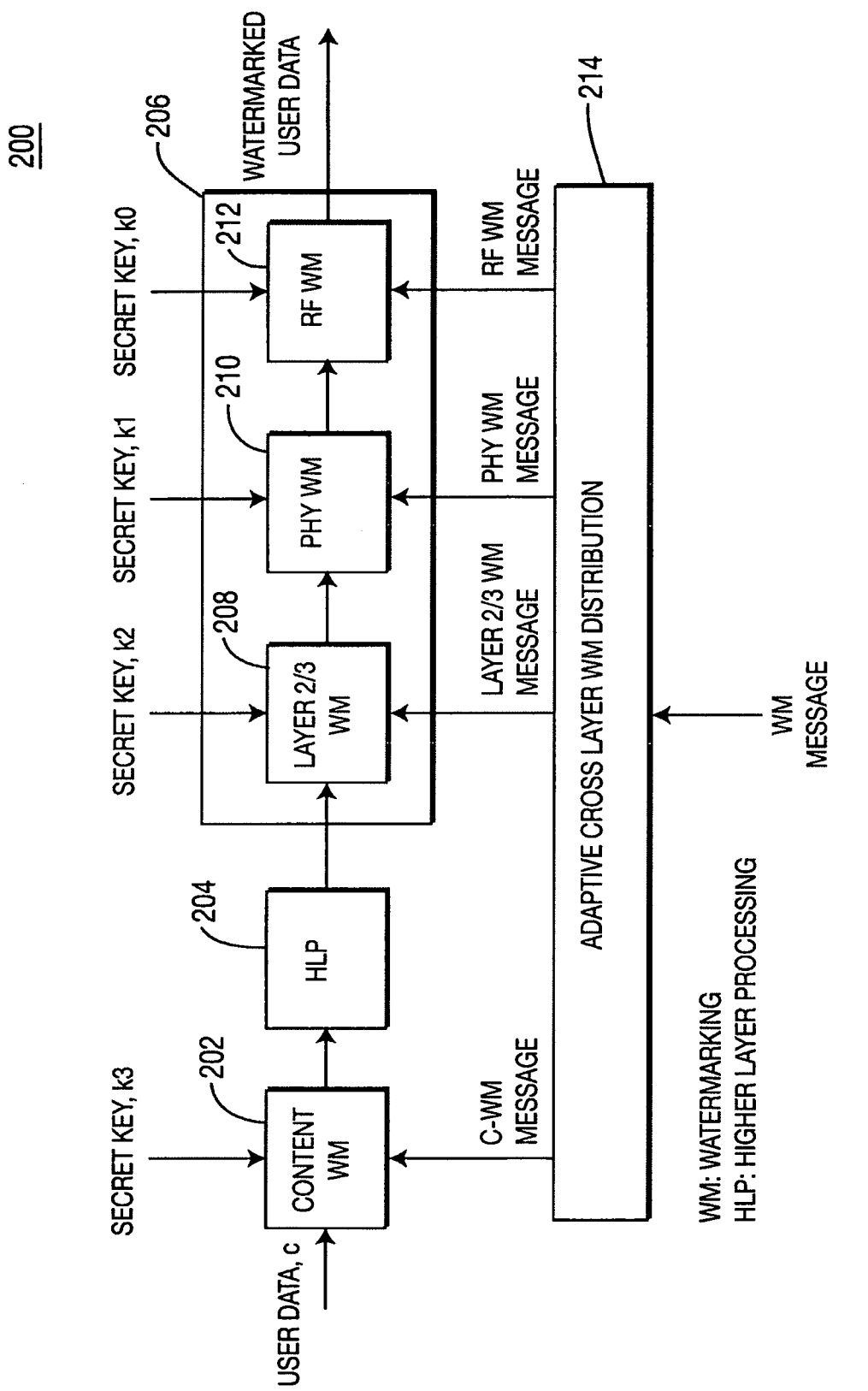
FIG. 2 is a block diagram of a transmitter for transport watermarking in accordance with the present invention.

FIG. 2 is a block diagram of a transmitter 200 for transport watermarking in accordance with the present invention. The transmitter 200 comprises a content watermarking unit 202, a higher layer processing (HLP) unit 204, a transport watermarking unit 206, and an adaptive cross layer watermark distributor 214. The transport watermarking unit 206 comprises one or more sub-layer watermarking units, including at least one of a Layer 2/3 watermarking unit 208, a PHY watermarking unit 210, and an RF watermarking unit 212. The transmitter 200 receives user data, c for wireless communication to the receiver. The user data is preferably protected first by content watermarking by the content watermarking unit 202. The user data streams are then processed by the HLP unit 204 to perform higher layer processing. The higher layer processed data is then processed by the transport watermarking unit 206. The adaptive cross layer watermark distributor 214 takes watermark message(s) as input and allocates and distributes the watermark message to the sub-layer watermarking systems in the transport watermarking unit 206 in an adaptive way depending on several system parameters including radio channel quality indication, security/protection level, and watermark message capacity.

The individual sub-layer watermark message may be the same for all the sub-layer watermarking units, unique for all of the sub-layer watermarking units, or a combination thereof. Each of the sub-layer watermarking units operates either independently or jointly. The watermark message is embedded in any one or a multiple of Layer 2/3, PHY Layer, or RF Layer. For example, PHY watermarking and RF watermarking may be done jointly in a complementary cooperative way such that the PHY watermarking techniques do not interfere with the RF watermarking techniques or vice versa. In addition, for a given time period, each sub-layer watermarking unit may be either active or inactive. The system is adaptive and flexible. It is preferable that a watermarking controller, preferably in a higher layer, provides the transport watermarking unit 206 with information regarding where and how the watermark message should be embedded.

In RF watermarking, the token/key can be embedded into the RF carrier phase/frequency, transmitted signal waveform, (or filter shaping coefficients), MIMO coefficients, (or smart antenna configuration), etc. Typically, RF watermarking is radio air interface specific. Examples of RF watermarking include, but are not limited to:

1.) modulating (or adjusting) carrier frequency within allowed limits wherein the amount of the adjustment is an indication of bits of the watermark;

2.) varying guard time intervals where the amount of the individual interval corresponds to a bit sequence of the watermark;

3.) introducing low level tones in the spectrum where each tone is associated with a watermark message;

4.) varying the spectrum within an allowed spectrum mask, (e.g. by changing the pulse shaping filter coefficients), where a set of the filter coefficients is associated with a watermark message; and 5.) use of pseudo-randomly selected subcarriers in an orthogonal frequency division multiplex (OFDM) system where the selection is made according to the watermarks being utilized.

In PHY watermarking, the token/key can be embedded directly within the user data on a bit (or symbol) level. Examples of PHY watermarking include, but are not limited to:

1.) use of a DPC technique for watermark encoding, which will be discussed later in greater detail;

2.) embedding the token/key into a physical channel such that some of the redundancy bits of the channel code (FEC) are replaced with bits relating to the token/key;

3.) transferring the token/key by initializing an FEC shift register with the token/key prior to channel coding of the user data stream;

4.) changing the physical layer transmission format configuration, (e.g. by changing the modulation type and/or coding rate), where a set of the configuration corresponds to a watermark; and 5.) modulating the amplitude in a constant envelope modulation scheme (secondary modulation) where the amount of the amplitude is an indication of bits of the watermark.

PHY watermarking may be independent of or specific to a radio air interface. For example, the first four examples of PHY watermarking techniques provided above are radio interface independent, while the last example is considered radio interface specific.

In Layer 2/3 watermarking, the token/key may preferably be placed into the Least Significant Bits (LSBs) of uncompressed user data or the control field of compressed user data, (e.g., header). In addition, one of the roles of Layer 2/3 is to determine the rates of user data and token/key(s) to be transmitted.

Using watermarking at lower layers (e.g., RF and PITY layers) of the communication stack provides advantages. Authentication of wireless communications can occur at lower layers and undesired communications can be identified at the lower layers. As a result, these communications can be discarded or blocked from being processed by higher layers eliminating unnecessary higher layer processing and avoiding resources from being consumed. Additionally, since these undesired communications may not be passed to higher layers, certain attacks on the wireless system can be prevented, such as denial of service (DoS) attacks or virus attacks, meaning added security for wireless communications.

Lower layer authentication tends to authenticate specific wireless links. Accordingly, unauthorized individuals not using proper links can be identified, which is more difficult and sometimes impossible to achieve at higher layers. For instance, an unauthorized user may attempt to penetrate a network through attacks such as active eavesdropping, man in the middle, session hijacking, replay etc. on a secure (watermark level) wireless network. If the unauthorized user is not aware of a required wireless watermark (token/key) or does not have the hardware/software to generate such a watermark, the unauthorized user will not be allowed access to the secure wireless network, although that user is using legitimate identifiers for network access.

Additionally, a PHY layer watermarking function can be added to an existing wireless modem and introduced into a system without changing the air interface specification. The watermarking functionality can co-exist with the existing air interface and can be optionally turned on or off to introduce secure links selectively and can be retrospectively introduced into an existing system maintaining backward compatibility.

It should be noted that it is not necessary to use all watermarking techniques in all individual layers and, in a preferred embodiment, any number of watermarking techniques may be used in one or more layers, as desired. The cross-layer watermarking scheme may be optimized depending on a given/required level of security and the computational complexity.

Figure 3:
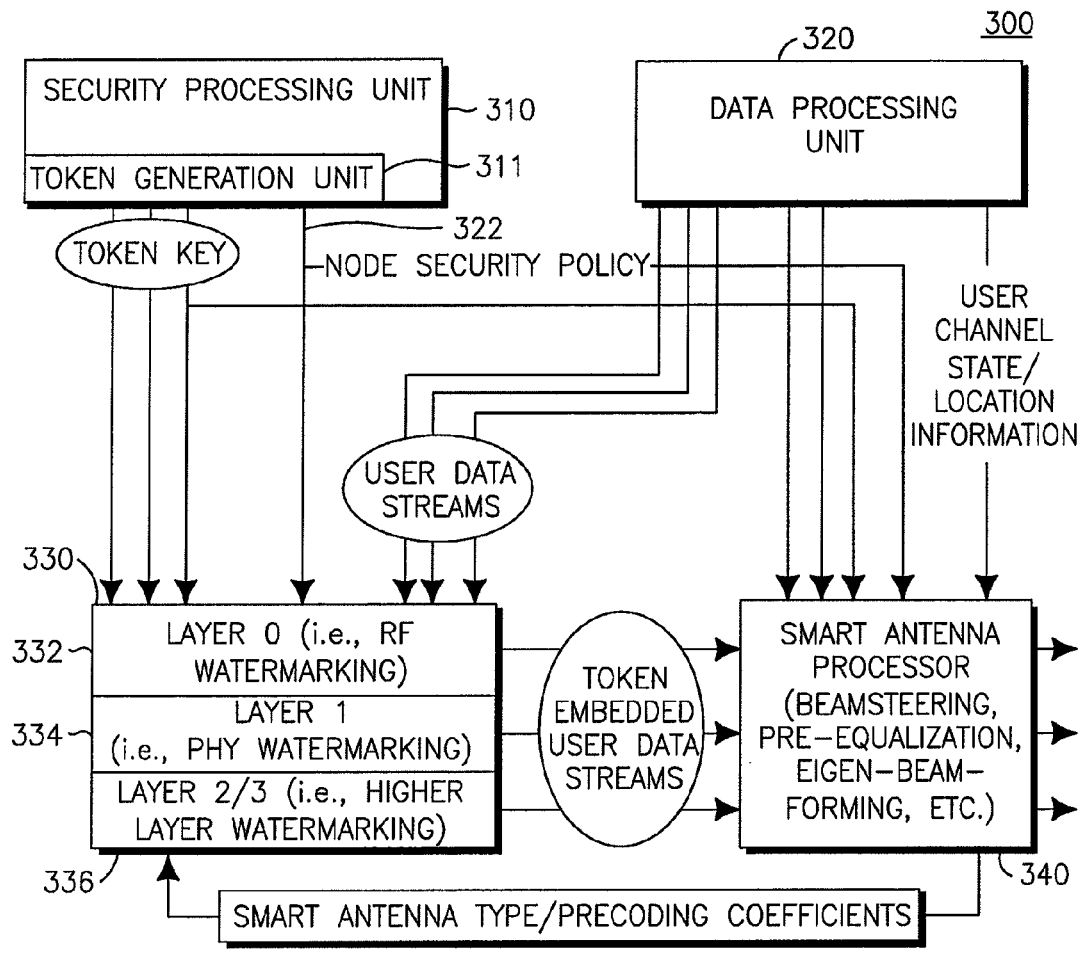
FIG. 3 is a block diagram of an apparatus for securing wireless communications using cross-layer watermarking in accordance with the present invention.

FIG. 3 is a block diagram of an apparatus 300 for securing wireless communications using cross-layer watermarking in accordance with the present invention. The watermarking architecture shown in FIG. 3 is configured to securely and robustly exchange token/key(s) between the sender and intended receiver(s) in a wireless environment by using watermark technology at the transport level. The apparatus 300 comprises a security processing unit 310, a data processing unit 320, a cross-layer watermarking unit 330 and optionally a smart antenna processor 340 along with a smart antenna (not shown).

The security processing unit 310 controls the overall watermark embedding procedures by sending a node security policy 322 to the cross-layer watermarking unit 330 and the smart antenna processor 340. The security policy typically indicates a level of security requirement. The security processing unit 310 determines the scheme and degree of watermarking depending on the user data and/or security policy. The security processing unit 310 includes a token/key generation unit 311 which generates a token/key for watermarking. The token/key may be generated on a per user, per datastream, per connection, or per packet basis or on any other relevant basis. Therefore, a different token/key may be embedded in each user, each connection, and each packet.

The data processing unit 320 generates user data streams. The data stream may be audio, video, text, data or combination thereof. Generated user data streams enter the cross-layer watermarking unit 330. In addition, radio channel state information may be provided to the smart antenna processor 340. By way of example, the radio channel state information may be used for adaptive rate allocation and/or adaptive antenna processing by the smart antenna processor 340.

The cross-layer watermarking unit 330 receives the token/key from the security processing unit 310 and user data stream from the data processing unit 320. The cross-layer watermarking unit 330 embeds the token/key into the user data stream in accordance with the node security policy 322 specified by the security processing unit 310. The token/key embedded user data is transmitted by an antenna (not shown). Where the present invention is implemented with a smart antenna (not shown), the smart antenna processor 340 determines appropriate parameters for beam steering, pre-equalization, eigen-beamforming, etc.

The cross-layer watermarking unit 330 includes preferably three layers in accordance with the present invention: layer-0, (a RF watermarking layer) 336, layer-1, (a PHY watermarking layer) 334 and layer-2/3, (a higher layer watermarking layers) 332. Optionally, the cross-layer watermarking unit 330 may include additional layers for performing different watermarking schemes such as application layer (e.g. content) watermarking.

In Layer-2/3 332, tokens/keys may be placed in the least significant bit (LSB) of (uncompressed) user data or the control field of (compressed) user data, (for example, a header). In addition, the Layer-2/3 332, (e.g., a MAC layer), may determine the rates of user data and token(s)/key(s) to be transmitted.

In Layer-0 336 and Layer-1 334, tokens/keys are embedded directly into user data or into physical and/or RF waveforms. The watermarking can be further classified into two stages: radio interface (RI) independent watermarking and RI specific watermarking. It is noted that RF (layer-0) watermarking is typically RI specific whereas PHY (Layer-1) watermarking includes RI independent (bit-level) techniques and RI specific (symbol/waveform level) techniques.

The use of RI independent watermarking or RI specific watermarking or both is preferably determined according to a node security policy that is signaled from the security processing unit 310. In RI independent watermarking, the watermark encoding and embedding functions are not affected by the particular RI in which the watermarking is being implemented and they are generally implemented based on bit level permutations. On the other hand, RI specific watermarking exploits the characteristics of a given RI, such as the signal constellation (or waveform) and FEC (or CRC) structure used in the RI. With such a classification, the RF watermarking can be thought of as RI specific watermarking. It should be noted that the watermarking architecture is independent of content type and applications, but with dependence on wireless radio channels.

Optionally, if a smart antenna is utilized, the token/key embedded data may be further processed by the smart antenna processor 340. The smart antenna processor 340 controls a smart antenna to carry token/key information by exploiting the characteristics of the smart antenna.

Figure 4:
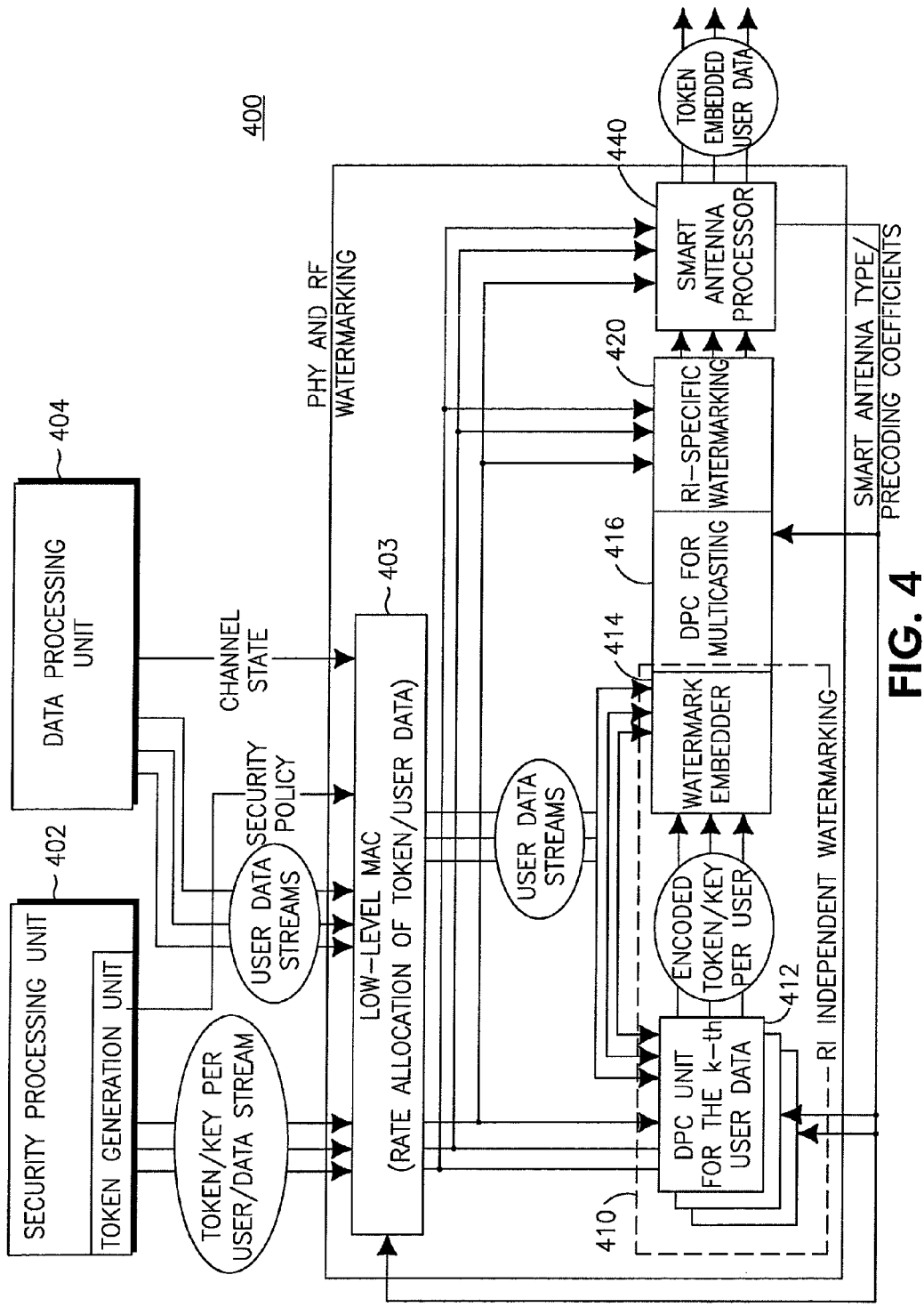
FIG. 4 is a block diagram of an apparatus implementing a PHY and RF watermarking scheme in accordance with the present invention.

FIG. 4 is a block diagram of an apparatus 400 implementing a PHY and RF watermarking scheme, in accordance with the present invention. The apparatus 400 preferably utilizes DPC in PHY watermarking.

As mentioned above, Layer-0 watermarking techniques are typically RI specific. Therefore, apparatus 400 includes an RI specific watermarking unit 420 for performing RI specific watermarking at Layer-0. As also mentioned above, Layer-1 watermarking may be either RI specific or RI independent. Therefore, the RI specific watermarking unit 420 is configured to perform RI specific watermarking at Layer-1. Additionally, the apparatus 400 includes an RI independent watermarking unit 410 for performing RI independent watermarking at Layer-1. RI independent watermarking or RI specific watermarking or both are performed depending on a node security policy sent from the security processing unit.

A low-level medium access control (MAC) entity 430 receives a token/key preferably per user or per data-stream as well as user data streams from the security processing unit 402 and the data processing unit 404, respectively, and performs rate allocations of the token(s) and user data stream(s). The low-level MAC entity 430 is preferably located at the PHY layer for fast channel adaptation, as in UMTS High Speed Downlink Packet Access (HSDPA). The MAC entity 430 allocates the individual rates of token/key and user data according to the security policy, the channel state information, and other factors such as bandwidth availability and user data requirements.

The RI independent watermarking unit 410 comprises a DPC unit 412 and a watermark embedder 414. The present invention preferably utilizes DPC for RI independent watermarking. The DPC unit 412 receives rate matched tokens/keys, user data streams, smart antenna type (if available), and pre-coding coefficients and encodes the token/key for each user, (or data stream), as a function of the user data stream.

In a preferred embodiment, DPC techniques, as explained above, are applied for watermarking encoding of each token/key on a bit level. The DPC based watermark encoding is RI independent, but dependent on user data (i.e., informed encoding). The encoded token/key is output to the watermark embedder 414. The watermark embedder 414 also receives the user data stream and embeds individual encoded tokens/keys into their respective user data stream.

Figure 5:
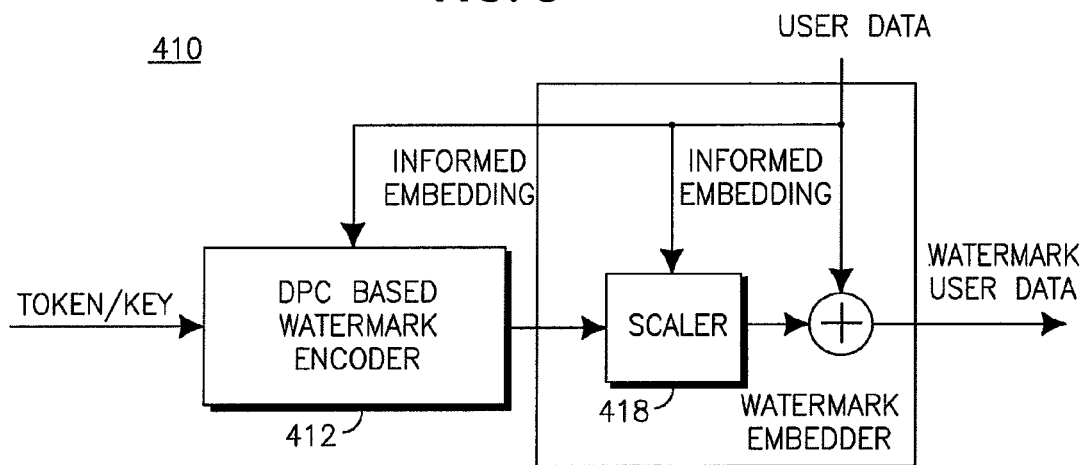
FIG. 5 is a block diagram of a radio interface (RI) independent watermarking unit in accordance with the present invention.

FIG. 5 is a detailed block diagram of an RI independent watermarking unit 410 in accordance with the present invention. During the watermark embedding process, the watermark embedder 414 examines the user data in preparation for embedding (i.e. informed embedding), attempting to attain a compromise between some conflicting requirements including robustness and perceptual fidelity. A simple embedding technique may be scaling of the coded token/key by a scaler 418, followed by addition to the user data, as shown in FIG. 5. The problem of designing a watermark embedder 414 can be seen as an optimization problem. The watermark embedded user data is sent to the antenna for transmission.

Referring again to FIG. 4, it is noted that RI specific watermarking may be implemented by the RI specific watermarking unit 420 in accordance with the node security policy. Further, RI specific watermarking may be implemented alone or in combination with RI independent watermarking. The RI specific watermarking unit 420 receives token/key from the security processing unit 402 and performs RI specific watermarking on a fresh user data stream or an RI independent watermark embedded user data stream.

By way of explanation, below are descriptions of RI specific watermarking techniques as they may be applied in an Orthogonal Frequency Division Multiplexing (OFDM) RI and a Code Division Multiple Access (CDMA).

RI specific watermarking techniques which may be implemented in an OFDM type system are as follows. It is noted that these techniques may be implemented in other types of RIs as well and they are provided purely by way of example as other techniques may be used as well.

Use Of Pilot Sub carriers—an OFDM PLCP protocol data unit (PPDU) is split across a multitude of sub-carriers before it is transmitted. The IEEE 802.11 standard specifies, for example, that an OFDM physical layer split a PPDU across fifty-two (52) separate sub-carriers, four of which are dedicated to be pilot sub-carriers. Typically, all sub-carriers are encoded with like data such as, for example, a +1 or −1, to serve as a ground reference for a demodulator. This predetermined encoding is rolled from OFDM symbol to OFDM symbol. For watermarking in accordance with the present invention, a specified pilot sub-carrier is manipulated with information that is the exact opposite of what it expected. For instance, a pilot sub-carrier expected to be encoded with a +1 can be manipulated to include a −1 instead.

Frequency Hopping—this scheme utilizes OFDM carrier frequencies to transmit watermark information. In current WLAN implementations, receivers must acquire a RF carrier frequency offset of a transmitter for every OFDM data packet transmission. In accordance with the present invention, this transmitted carrier frequency is modified by adding or subtracting a few hundred or thousand hertz within a capture range in a predetermined pattern. The pattern in which the center frequency fluctuates over time serves to provide hidden bit information, i.e., a watermark. For instance, determining in a receiving demodulator that a carrier frequency is higher than expected could represent a +1, whereas receiving a carrier frequency that is lower than expected could be used to represent a 0.

RI specific watermarking techniques which may be implemented in a CDMA type system are as follows. It is noted that these techniques may be implemented in other types of RIs as well and they are provided purely by way of example as other techniques may be used as well.

Stealing Spreading Code Chips For Watermarking—in CDMA systems, spreading codes are used to separate mobile devices or base stations from each other. In this case, certain chips in the spreading code are selected and watermark information in embedded on these chips (i.e., keep as is if 0, flip if 1). In this case, the picked chip locations are known at both transmitter and receiver.

Frequency Shift Keying (FSK) Modulation Based Watermarking With Spreading Code Jitter—for watermarking, slow spreading code jitter is applied with respect to the carrier frequency and FSK modulation of watermark information on top of this jitter by placing a low frequency drift on the carrier frequency, (i.e., by gradually incrementing the frequency, either in an upwards or downwards direction, in small frequency steps). The watermark information is mapped to a predefined frequency offset. When spreading code jitter occurs, a local descrambler in the receiver has to be synchronized to generate the same spreading code jitter (representing the watermark information).

While RI independent watermarking is generally implemented on a transport channel or bit level, RI specific watermarking is preferably performed on a bit, symbol, pulse-shaping level, or any combination thereof. For instance, in a spread-spectrum type (including CDMA) specific watermarking system, token/key information can be represented as spreading codes (including channelization codes and scrambling codes).

The token embedded user data streams provided by an RI specific watermarking unit, (or RI independent watermarking unit), may be further processed by a smart antenna processor 440 in order to add the level of watermarking security/robustness. The smart antenna (not shown) (or MIMO antenna) may be implemented as a beamformer, a precoder (or preequalizer), or a diversity antenna. For instance, a token/key may be represented using information relating to antennas, including antenna patterns (beams), antenna weights, delays between antenna elements, antenna spacing, antenna hardware information, antenna state (directional or omni), antenna configuration, antenna switching rate, antenna steering consistency, antenna cross correlation, and characteristics of the spatial distribution. In addition, a precoding (or eigen-beamforming) approach may be used, especially in MIMO channels, in order to provide a potential form of physical layer resistance to eavesdropping attacks. The approach exploits dispersive spatial-temporal (MIMO) channels in conjunction with coefficients of a precoder (or eigen-beamformer). In MIMO systems, the MIMO channel as produced by the various antenna elements can be viewed as a spatial spreading function. For watermarking, the transmitted MIMO waveform may be modified to indicate bits of a watermark. For instance, a matrix, resulting from SVD (singular value decomposition) in MIMO communications, may be used to carry bits such that a specific rotation sequence used in the matrix is used to carry the watermark. When a smart antenna system is implemented with a beam steering or (eigen-) beamforming scheme, the MAC may allocate users between (eigen-) beams as well.

When the communicating device communicates with multiple other communicating devices, (for example, broadcasting channels), the token embedded user data streams for the individual receiving device may be further processed by the DPC unit (see FIG. 4) for multicasting 416 in order to take advantages of DPC for multicasting/broadcasting such that DPC can achieve the sum-rate-capacity of a MIMO broadcast channel. The DPC for token encoding and DPC for broadcasting may be jointly performed. For a point-to-point communication, the DPC function for broadcasting is disabled.

It is noted that the present invention can be applied to both downlink (broadcasting) and uplink (multiple access). In the downlink, broadcasting transmission can be maximized in terms of sum transmission rate. In addition, the DPC function for broadcasting can be further optimized taking into account the implemented smart antenna technique. The cross-layer watermarking (including RI independent/specific watermarking) can maximize the watermarking performance. DPC's applicability as a technique both for efficient broadcasting and efficient watermarking of data makes it a tool which can be used to jointly or independently address both of these needs within a single implementation.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A transmitter for transmitting information in accordance with a security policy, the transmitter comprising:
   a content watermarking unit configured to perform initial watermarking of user data, which produces a content watermarked message;
   a higher layer processing unit configured to perform higher layer processing of the initial watermarked user data;
   a transport watermarking unit configured to transmit watermarked user data, and embed a token or key or both into user data transmission, the transport watermarking unit comprising at least one sub-layer watermarking unit; and
   a cross layer watermarking distributor configured to adaptively allocate and distribute the content watermarked message to the at least one sub-layer watermarking unit based on system parameters.

2. The transmitter of claim 1, wherein the sub-layer watermarking unit comprises at least one of:
   a physical layer (PHY) watermarking unit configured to perform PHY layer watermarking;
   a radio frequency (RF) watermarking unit configured to perform RF layer watermarking; or
   a layer 2/3 watermarking unit configured to perform layer 2/3 watermarking.

3. The transmitter of claim 1 wherein the system parameters include radio channel quality indication.

4. The transmitter of claim 1 wherein the system parameters include security protection level.

5. The transmitter of claim 1 wherein the system parameters include watermark message capacity.

* * * * *